(12) United States Patent
Nohara (10) Patent No.: US 7,573,438 B2
(45) Date of Patent: Aug. 11, 2009

(54) DISPLAY DEVICE AND PORTABLE ELECTRONIC DEVICE

(75) Inventor: Koichi Nohara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 583 days.

(21) Appl. No.: 10/942,931

(22) Filed: Sep. 17, 2004

(65) Prior Publication Data

US 2006/0028395 A1 Feb. 9, 2006

(30) Foreign Application Priority Data

Aug. 9, 2004 (JP) ............................. 2004-232514

(51) Int. Cl.
G09G 5/00 (2006.01)
(52) U.S. Cl. ...................................... 345/1.1
(58) Field of Classification Search ................. 345/1.1, 345/1.2, 1.3, 1, 168, 204.87; 455/566, 575.1, 455/575.2
See application file for complete search history.

(56) References Cited

U.S. PATENT DOCUMENTS

| 5,841,431 | A | * | 11/1998 | Simmers ..................... 345/211 |
| 5,881,299 | A | * | 3/1999 | Nomura et al. ............. 713/324 |
| 6,018,787 | A | | 1/2000 | Ip |
| 6,442,645 | B1 | | 8/2002 | Freker |
| 6,522,309 | B1 | | 2/2003 | Weber |
| 7,058,426 | B2 | * | 6/2006 | Masuda et al. .............. 455/566 |
| 7,365,704 | B2 | * | 4/2008 | Wang et al. .................. 345/1.2 |
| 2002/0118144 | A1 | * | 8/2002 | Edmonds ..................... 345/1.1 |
| 2003/0092467 | A1 | | 5/2003 | Masuda et al. |
| 2004/0263425 | A1 | * | 12/2004 | Anzai et al. .................. 345/1.1 |
| 2005/0253773 | A1 | * | 11/2005 | Sekiguchi .................... 345/1.1 |

FOREIGN PATENT DOCUMENTS

| JP | 2-253394 | 10/1990 |
| JP | 2000-56733 | 2/2000 |
| JP | 2004-134827 | 4/2004 |

OTHER PUBLICATIONS

Communication and Search Report from the European Patent Office, Sep. 1, 2006 (3 pages).
Communication issued by the European Patent Office on Feb. 16, 2007, for European Patent Application No. 04 022 288.7.
Notification of Reasons for Rejection mailed Aug. 21, 2007 from the Japanese Patent Office for Japanese Patent Application No. 2004-232514.
Communication issued by the European Patent Office on Apr. 15, 2008, for European Patent Application No. 04 022 288.7.

* cited by examiner

*Primary Examiner*—Amr Awad
*Assistant Examiner*—Stephen G Sherman
(74) *Attorney, Agent, or Firm*—Finnegan, Henderson, Farabow, Garrett & Dunner, L.L.P.

(57) ABSTRACT

A display device includes first and second displays, first and second display control circuits which respectively control the displays, and a signal transmission path which is shared between the first and second displays and has one system of signal lines. The display device further includes a switching circuit for the signal transmission path and a switching control circuit for the switching circuit. The switching control circuit performs switching control of the switching circuit in synchronism with display control by the first and second display control circuits. The first display and first display control circuit, and the second display and second display control circuit are alternately connected by the signal transmission path.

18 Claims, 6 Drawing Sheets

FIG. 8  Simultaneous display on main LCD and Sub-LCD

FIG. 9  Simultaneous display on main LCD and Sub-LCD

DISPLAY DEVICE AND PORTABLE ELECTRONIC DEVICE

CROSS-REFERENCE TO RELATED APPLICATIONS

This application is based upon and claims the benefit of priority from prior Japanese Patent Application No. 2004-232514, filed Aug. 9, 2004, the entire contents of which are incorporated herein by reference.

BACKGROUND OF THE INVENTION

1. Field of the Invention

The present invention relates to a display device having a plurality of displays and a portable electronic device having the display device.

2. Description of the Related Art

Recently, most portable electronic devices comprise a display device having a plurality of displays. For example, a foldable portable terminal formed by pivotally connecting first and second housings via a hinge has a main display on the front surface of the first housing and a sub-display on the rear surface of the first housing. The main display displays all display data such as transmission/reception data, telephone book data, and various control information representing the operating state of the terminal. The sub-display displays control information to be notified of the user in the standby state. The display is generally an LCD (Liquid Crystal Display).

A display device attached to a portable electronic device generally comprises a main display controller and sub-display controller in correspondence with the main display and sub-display. The main display controller and main display, and the sub-display controller and sub-display are respectively connected by independent signal lines. This greatly increases the number of signal lines for connecting displays and display controllers, and the degree of freedom in designing the device decreases.

Especially in a foldable portable terminal, the main display and sub-display are arranged in the first housing, whereas the main display controller and sub-display controller are arranged in the second housing. Many signal lines must be passed through the hinge, which makes downsizing of the hinge and a change in design difficult. Since the number of connector terminals increases in accordance with the number of signal lines, it also becomes difficult to downsize the printed wiring board and housing.

In order to decrease the number of signal lines, there is proposed a technique of transmitting an LCD driving signal from the LCD driver to the LCD panel by time division through a common signal line together with a data signal from an output circuit to a peripheral circuit, as disclosed in, e.g., Jpn. Pat. Appln. KOKAI Publication No. 2000-56733.

According to the conventionally proposed technique, an LCD driving signal to the LCD panel and a data signal to the peripheral circuit are transmitted by time division through a common signal line. This technique does not disclose transmission of display data to a plurality of displays by using a common signal line. Time division transmission requires a time division multiplexing process, resulting in a complicated process and expensive device.

BRIEF SUMMARY OF THE INVENTION

It is an object of the present invention to provide a display device and portable electronic device which decrease by a simple circuit configuration the number signal lines for connecting a plurality of displays and their display control circuits, thereby downsizing the device and increasing the degree of freedom in design.

To achieve the above object, according to an aspect of the present invention, a display device comprises first and second displays, first and second display control circuits which respectively control the displays, and a signal transmission path which is shared between the first and second displays and has one system of signal lines. The display device further comprises a switching circuit for the signal transmission path and a switching control circuit for the switching circuit. The switching control circuit performs switching control of the switching circuit in synchronism with display control by the first and second display control circuits. The first display and first display control circuit, and the second display and second display control circuit are alternately connected by the signal transmission path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An outline of preferred embodiments of the present invention will be described.

In order to connect first and second displays and first and second display control circuits for respectively controlling these displays, the first aspect of the present invention prepares a signal transmission path having one system of signal lines shared between the first and second displays, and arranges a switching circuit and its switching control circuit. The switching control circuit performs switching control of the switching circuit in synchronism with display control by the first and second display control circuits. The first display and first display control circuit, and the second display and second display control circuit are alternately connected by the signal transmission path.

According to the present invention, the signal transmission path can be shared between the first and second displays by a relatively simple circuit configuration using only the switching circuit. The display device can be downsized at low cost, and the degree of freedom in design can be increased. Particularly when the device according to the present invention is used in a portable electronic device with a foldable structure, a small hinge and a multi-joint hinge can be employed, facilitating various design changes in device. Since the number of connector terminals decreases along with a decrease in the number of signal lines, the printed wiring board and housing can also be easily downsized.

According to the second aspect of the present invention, at least one of the switching circuit and switching control circuit is integrated with one of the first and second display control circuits into one circuit module. With this arrangement, for example, when one of the first and second display control circuits is formed from a custom LSI, the switching circuit and switching control circuit can be assembled into the custom LSI. As a result, the circuit configuration can be simplified and downsized in comparison with a case in which the switching circuit and switching control circuit are separately arranged.

According to the third aspect of the present invention, when the signal transmission path is to be switched from the first state in which the first display and first display control circuit are connected to the second state in which the second display and second display control circuit are connected, the chip select of the first display is invalidated, and then transmission of display data to the first display stops. The switching circuit switches the signal transmission path from the first state to the second state, supply of display data to the second display starts, and then the chip select of the second display is validated.

With this arrangement, the first and second displays are disconnected from the signal transmission path after the chip select is invalidated. To the contrary, the chip select is validated after the first and second displays are connected to the signal transmission path. The influence of noise or the like generated in switching the signal transmission path can be eliminated, and stable display can be implemented.

The fourth aspect of the present invention further arranges a display holding circuit in at least one of the first and second displays. The display holding circuit holds display data transmitted from the first and second display control circuits via the signal transmission path. The held display data is kept supplied to the display even after the display is disconnected from the signal transmission path.

With this arrangement, the first and second displays can simultaneously display data though they share the signal transmission path. For example, when a foldable portable terminal receives an incoming call while the housings are open, termination notification information must be displayed on both the main display and sub-display. In this case, either the main display or sub-display is equipped with the display holding circuit. The circuit functions as a display buffer to simultaneously display data on the main display and sub-display.

A means for updating display data held by the display holding circuit can take the following two arrangements.

In the first arrangement, while the display holding circuit holds the first display data, the switching circuit is periodically switched, and the second display data is transmitted to the display holding circuit to update the first display data held by the display holding circuit to the second display data. With this arrangement, data displayed using the display holding circuit can be periodically updated while the data is simultaneously displayed on the first and second displays.

In the second arrangement, whether to update the first display data is determined while the display holding circuit holds the first display data. If the first display data is determined to be updated, the switching circuit is switched, and the second display data is transmitted to the display holding circuit to update the first display data held by the display holding circuit to the second display data. With this arrangement, data displayed using the display holding circuit can be updated only when the display data must be updated upon a change in the contents of the display data by a predetermined amount or more while the data is simultaneously displayed on the first and second displays.

Several embodiments according to the present invention will be described in detail below with reference to the several views of the accompanying drawing.

First Embodiment

Figure 1:
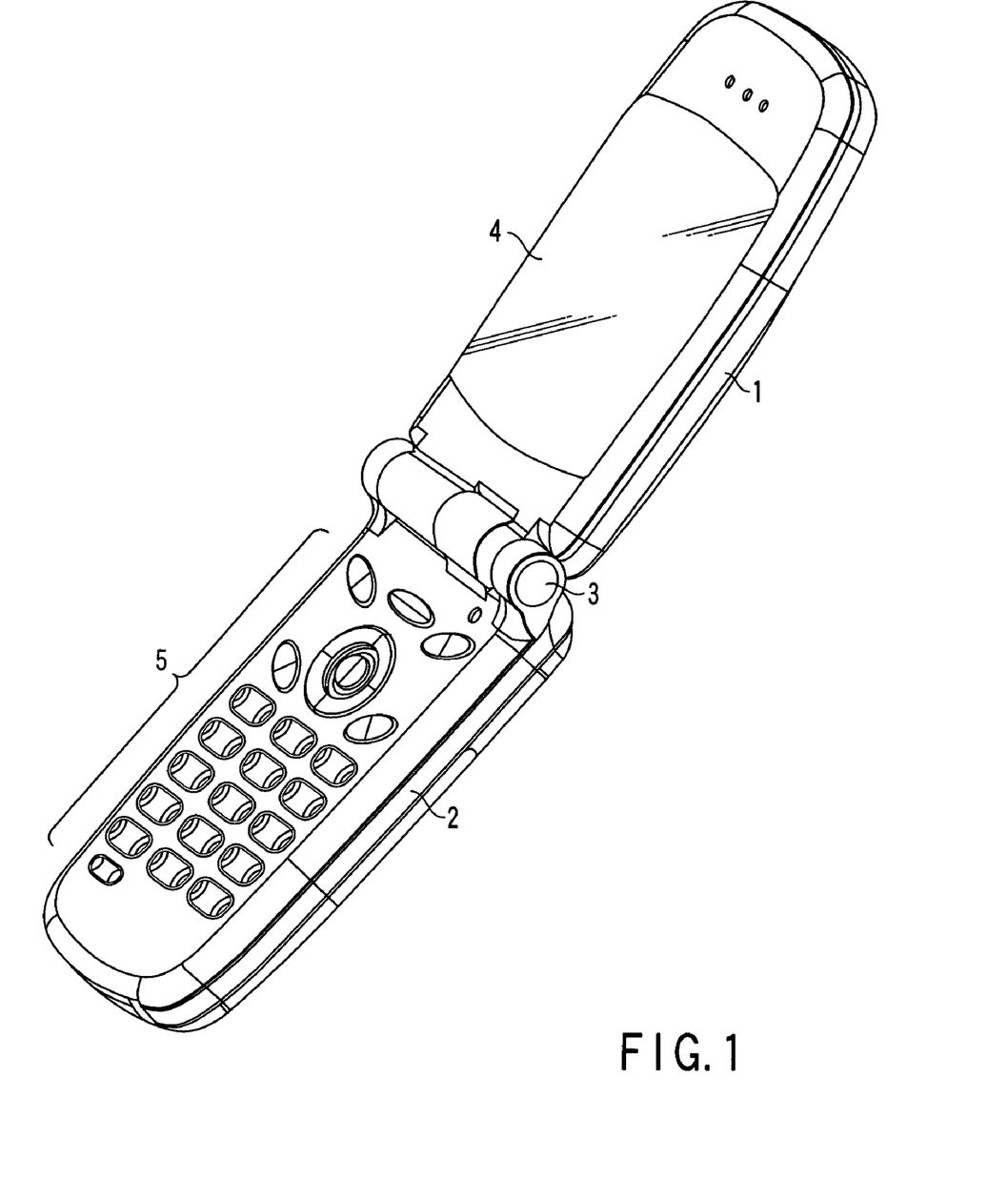
FIG. 1 is a perspective view showing a state in which the housings of a foldable portable communication terminal according to the first embodiment of the present invention are open.
Figure 2:
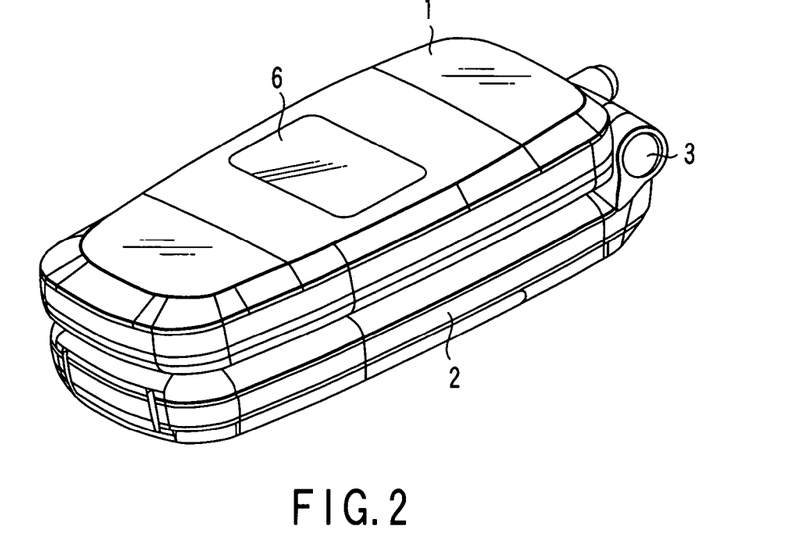
FIG. 2 is a perspective view showing a state in which the housings of the foldable portable communication terminal according to the first embodiment of the present invention are closed.
Figure 3:
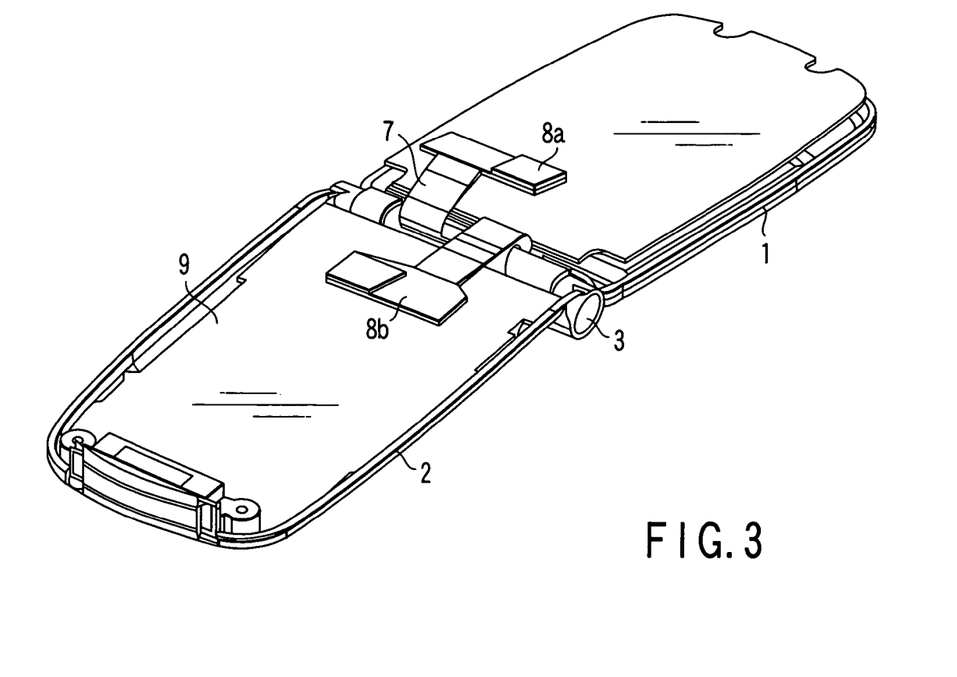
FIG. 3 is a perspective view showing the internal structure of the foldable portable communication terminal according to the first embodiment of the present invention.

FIGS. 1 to 3 are perspective views showing the outer appearance of a portable electronic device having a display device according to the first embodiment of the present invention. The portable electronic device of the first embodiment is a so-called foldable portable communication terminal formed by pivotally connecting an upper housing 1 and lower housing 2 via a hinge mechanism 3. FIG. 1 shows a state in which the housings 1 and 2 are open, and FIG. 2 shows a state in which the housings 1 and 2 are closed. FIG. 3 is a perspective view showing the internal structures of the upper housing 1 and lower housing 2.

The upper housing 1 comprises a main LCD (Liquid Crystal Display) 4 on the front surface and a sub-LCD (Liquid Crystal Display) 6 on the rear surface. The lower housing 2 incorporates a main printed wiring board 9 together with a key input device 5 and the like. The main printed wiring board 9 supports a main control unit 10, main display control unit 12, and sub-display control unit 13 (to be described later). The main printed wiring board 9 and the LCDs 4 and 6 are connected by a signal line cable 7. The signal line cable 7 is prepared by forming a plurality of signal line patterns on a flexible board and attaching connectors 8a and 8b to two ends. The signal line cable 7 is laid through a hole in the hinge 3.

Figure 4:
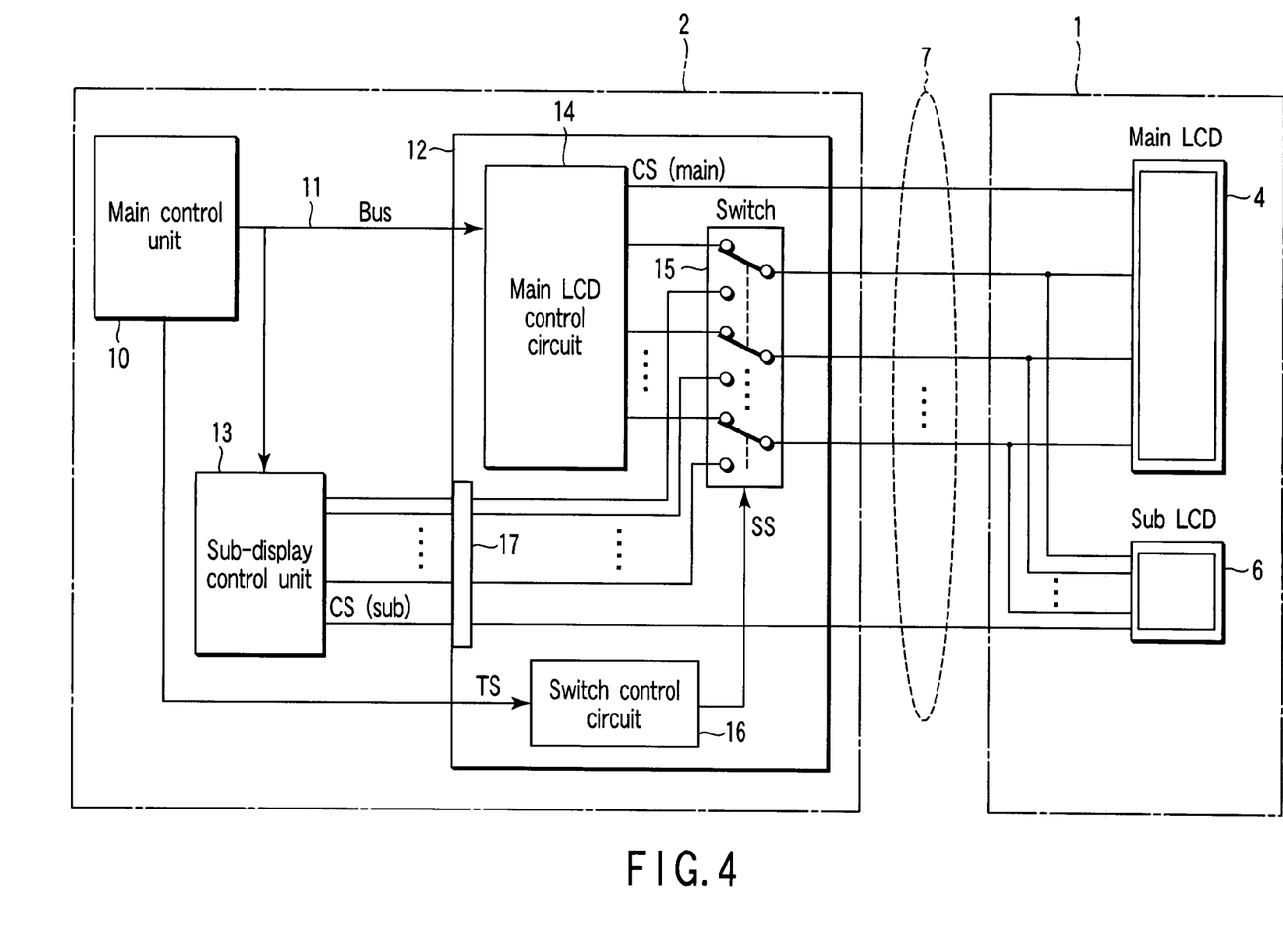
FIG. 4 is a block diagram showing the circuit configuration of a display device in the foldable portable communication terminal according to the first embodiment of the present invention.

The control circuit of the display device has the following configuration. FIG. 4 is a block diagram showing the circuit configuration. The control circuit of the display device comprises the main control unit 10, main display control unit 12, and sub-display control unit 13. These units 10, 12, and 13 are connected via a bus 11 and signal lines.

The main control unit 10 comprises a main CPU, and comprehensively controls the operation of the portable communication terminal under the control of the main CPU. The sub-display control unit 13 comprises a sub-LCD control circuit. Under the control of the main control unit 10, the sub-display control unit 13 supplies a chip select signal and display data for the sub-LCD 6 to the sub-LCD 6 via the main display control unit 12 (to be described later), and causes the sub-LCD 6 to display the data.

The main display control unit 12 is formed from a custom LSI on which a main LCD control circuit 14, switch 15, switch control circuit 16, and interface 17 are integrated. Under the control of the main control unit 10, the main LCD control circuit 14 supplies a chip select signal and display data to the main LCD 4 via the switch 15 and signal line cable 7, and causes the main LCD 4 to display the data.

The switch 15 is a general-purpose selector using a semiconductor switch, and alternately connects the main LCD control circuit 14 and interface 17 to the signal line cable 7. The switch control circuit 16 generates a switching signal SS in accordance with switching control data TS output from the main control unit 10, and supplies the generated switching signal SS to the switch 15 to control and switch the switch 15. The interface 17 receives a chip select signal and display data from the sub-display control unit 13, and supplies the received chip select signal and display data to the sub-LCD 6 via the switch 15 and signal line cable 7.

Display operation in the portable communication terminal having the above configuration will be explained.

(1) Display Operation in Standby State While Housings 1 and 2 of Portable Communication Terminal are Kept Closed In the standby state while the housings 1 and 2 of the portable communication terminal are kept closed, control to display data representing the operating state of the terminal on only the sub-LCD 6 is performed.

More specifically, the main control unit 10 supplies the switching control data TS for selecting the sub-LCD 6 to the switch control circuit 16 of the main display control unit 12. In response to this, the switch control circuit 16 outputs the switching signal SS to switch the switch 15 to the interface 17 side. The sub-display control unit 13 is connected to the sub-LCD 6 via the signal line cable 7.

The main control unit 10 supplies, to the sub-display control unit 13 via the bus 11, display data containing information on the current time, remaining battery amount, reception quality, and the like. Upon reception of the display data, the sub-display control unit 13 outputs the display data. The display data is received by the interface 17 of the main display control unit 12, and then supplied from the interface 17 to the sub-LCD 6 via the switch 15 and signal line cable 7.

The sub-display control unit 13 validates the chip select signal upon the lapse of a time necessary to supply the display data to the sub-LCD 6 and stabilize the display data. Consequently, the sub-LCD 6 becomes active and displays the data supplied from the sub-display control unit 13.

Also when the portable communication terminal receives an incoming signal in this state, only the sub-LCD 6 displays termination notification display data, similar to the operation in the standby state.

Figure 6:
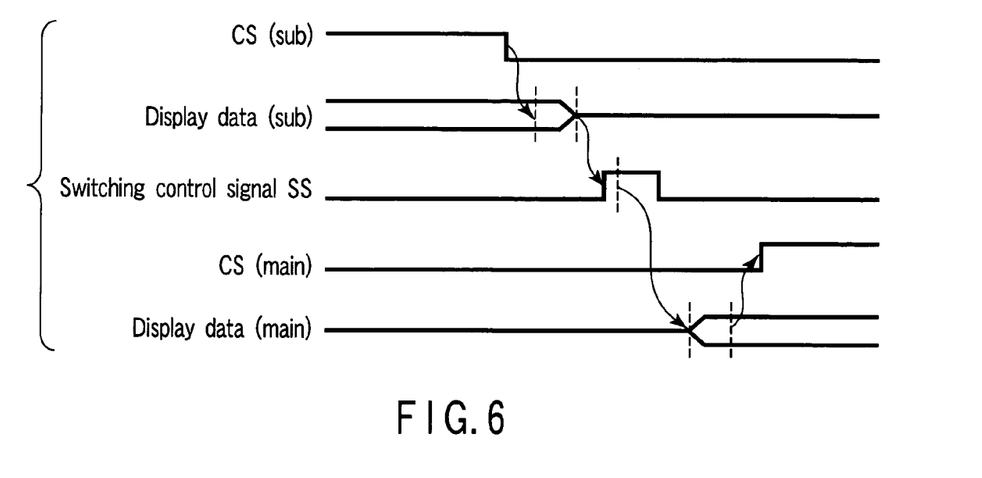
FIG. 6 is a timing chart used to explain the operation of the portable communication terminal shown in FIG. 4.

(2) Display Operation When Housings 1 and 2 of Portable Communication Terminal are Opened Assume that the housings 1 and 2 of the portable communication terminal are opened as shown in FIG. 1 for transmission, reception, or another operation. Then, control to switch the display LCD from the sub-LCD 6 to the main LCD 4 is performed. FIG. 6 is a timing chart showing the switching timing.

More specifically, the main control unit 10 supplies a display end command to the sub-display control unit 13. In response to this, the sub-display control unit 13 invalidates the chip select signal, and then stops supply of display data, as shown in FIG. 6. As a result, display on the sub-LCD 6 stops.

The main control unit 10 supplies, to the switch control circuit 16 of the main display control unit 12, the switching control data TS for switching the LCD from the sub-LCD 6 to the main LCD 4. The switch control circuit 16 outputs the switching signal SS to switch the switch 15 from the interface 17 side to the main LCD control circuit 14 side. The main LCD control circuit 14 is connected to the main LCD 4 via the signal line cable 7.

The main control unit 10 supplies, to the main LCD control circuit 14 via the bus 11, display data for transmission or reception. Upon reception of the display data, the main LCD control circuit 14 outputs the display data. The display data is supplied to the main LCD 4 via the switch 15 and signal line cable 7.

The main LCD control circuit 14 validates the chip select signal upon the lapse of a time necessary to supply the display data to the main LCD 4 and stabilize the display data. Consequently, the main LCD 4 becomes active and displays the data supplied from the main LCD control circuit 14. In this manner, the display is switched from the sub-LCD 6 to the main LCD 4.

Figure 5:
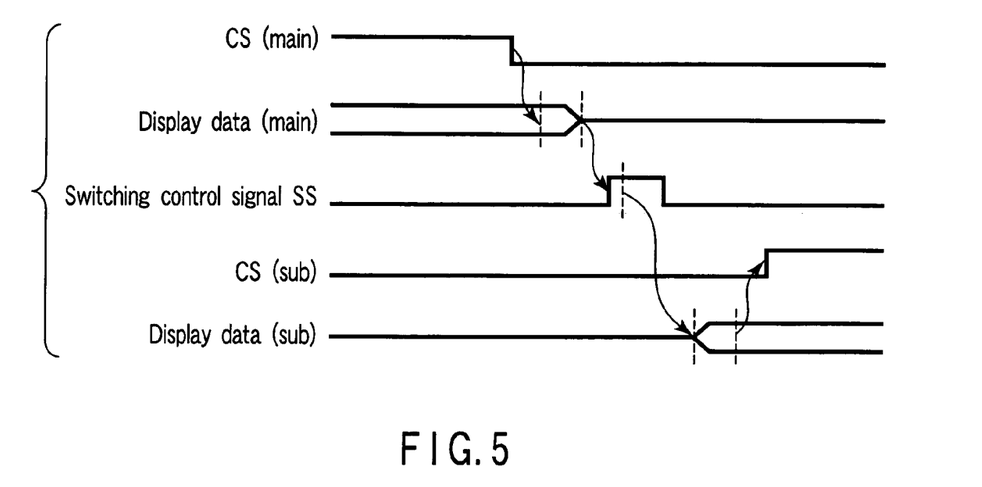
FIG. 5 is a timing chart used to explain the operation of the portable communication terminal shown in FIG. 4.

(3) Display Operation When Housings 1 and 2 of Portable Communication Terminal are Closed Assume that transmission, reception, or another operation ends, and the housings 1 and 2 of the portable communication terminal are closed as shown in FIG. 2. Then, control to switch the display LCD from the main LCD 4 to the sub-LCD 6 is performed. FIG. 5 is a timing chart showing the switching timing.

More specifically, the main control unit 10 supplies a display end command to the main LCD control circuit 14. In response to this, the main LCD control circuit 14 invalidates the chip select signal, and then stops supply of display data, as shown in FIG. 5. As a result, display on the main LCD 4 stops.

The main control unit 10 supplies, to the switch control circuit 16 of the main display control unit 12, the switching control data TS for switching the LCD from the main LCD 4 to the sub-LCD 6. The switch control circuit 16 outputs the switching signal SS to switch the switch 15 from the main LCD control circuit 14 side to the interface 17 side. The sub-display control unit 13 is connected to the sub-LCD 6 via the interface 17 and switch 15 of the main display control unit 12 and the signal line cable 7.

The main control unit 10 supplies, to the sub-display control unit 13 via the bus 11, display data representing the operating state of the terminal. The sub-display control unit 13 outputs the display data. The display data is received by the interface 17 of the main display control unit 12, and then supplied from the interface 17 to the sub-LCD 6 via the switch 15 and signal line cable 7.

The sub-display control unit 13 validates the chip select signal upon the lapse of a time necessary to supply the display data to the sub-LCD 6 and stabilize the display data. Consequently, the sub-LCD 6 becomes active and displays the data supplied from the sub-display control unit 13. Hence, the display is switched from the main LCD 4 to the sub-LCD 6.

As described above, the first embodiment prepares the signal line cable 7 having one system of signal lines for transmitting display data, and arranges the switch 15 and switch control circuit 16 in the main display control unit 12. The main LCD control circuit 14 and main LCD 4, and the sub-display control unit 13 and sub-LCD 6 are alternately connected by the signal line cable 7.

The signal line cable 7 of one system can be shared by a relatively simple circuit configuration using only the switch 15 formed from a general-purpose selector. The number of signal lines of the signal line cable 7 and the number of terminals of the connectors 8a and 8b can be reduced to downsize the device and increase the degree of freedom in design. For example, a small hinge 3 and a multi-joint hinge can be employed, and the portable communication terminal can be further downsized and changed in design along with downsizing of the printed wiring board. These effects are very effective for a foldable portable communication terminal in which the LCDs 4 and 6 and the control units 12 and 13 are distributed and arranged in the upper and lower housings 1 and 2.

In the first embodiment, the switch 15 and switch control circuit 16 are integrated with the main LCD control circuit 14 and the like into one custom LSI. The circuit configuration can be simplified and downsized in comparison with a case in which the switch 15 and switch control circuit 16 are arranged separately from the main LCD control circuit 14.

In the first embodiment, when the main LCD 4 and sub-LCD 6 are to be disconnected from the signal line cable 7, the chip selects of the LCDs 4 and 6 are invalidated prior to switching. When the main LCD 4 and sub-LCD 6 are to be connected to the signal line cable 7, the chip selects are validated after the end of switching. The influence of noise or the like generated in switching the signal line cable 7 can be eliminated, and stable display operation can be realized.

Second Embodiment

Figure 7:
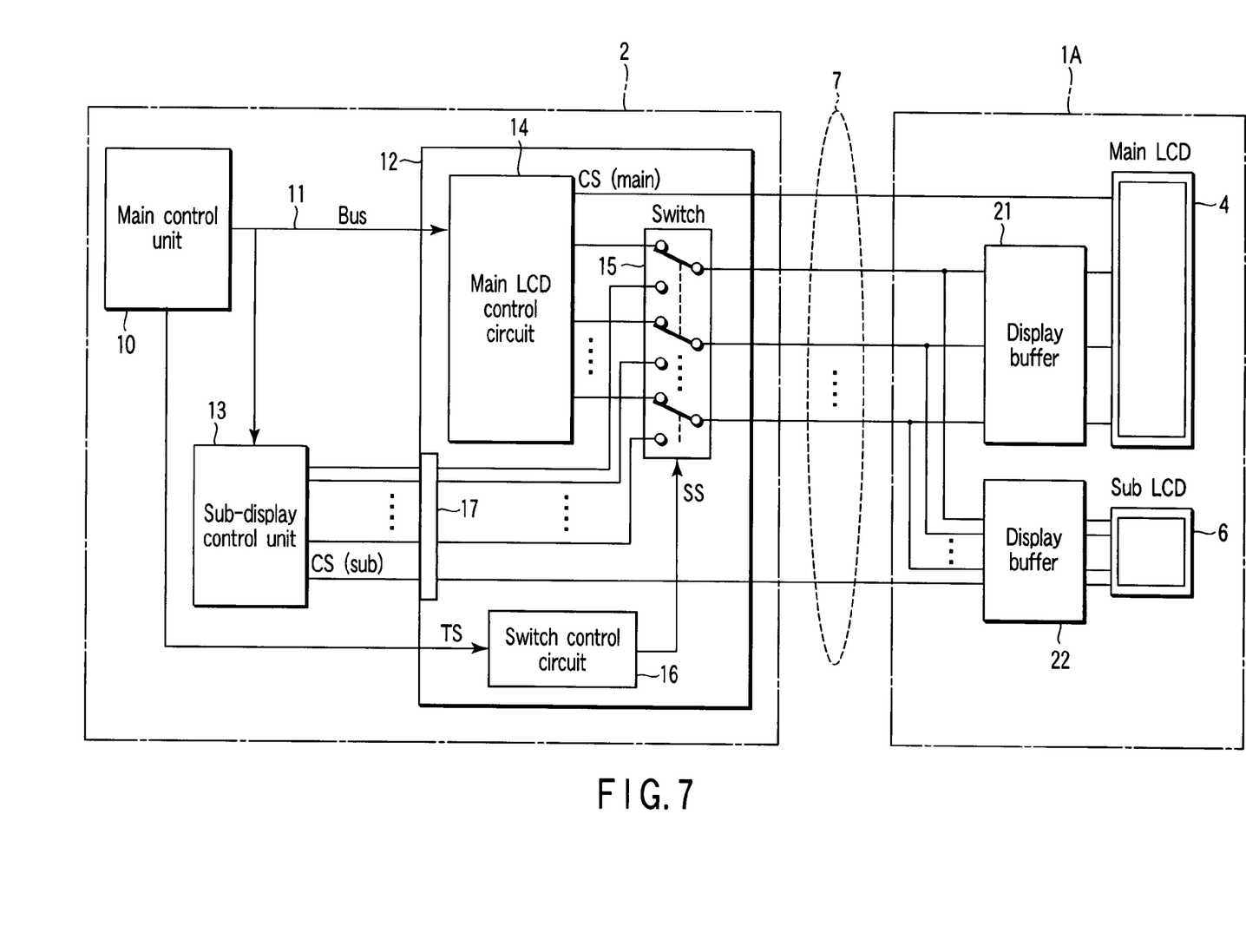
FIG. 7 is a block diagram showing the circuit configuration of a portable communication terminal according to the second embodiment of the present invention.

FIG. 7 is a block diagram showing the circuit configuration of a portable communication terminal according to the second embodiment of the present invention. In FIG. 7, the same reference numerals as in FIG. 4 denote the same parts, and a detailed description thereof will be omitted.

An upper housing 1A comprises display buffers 21 and 22 in correspondence with a main LCD 4 and sub-LCD 6. The display buffers 21 and 22 hold display data supplied from a main LCD control circuit 14 and sub-display control unit 13 via a signal line cable 7. The display buffers 21 and 22 keep supplying the held display data to the main LCD 4 and sub-LCD 6 to continue display even after the signal line cable 7 is disconnected.

This configuration can realize the following display operation. For example, when the portable communication terminal receives an incoming signal while the housings 1 and 2 are open, termination notification display data must be displayed on both the main LCD 4 and sub-LCD 6. Since the main LCD 4 and sub-LCD 6 share the signal line cable 7, the termination notification display data cannot be simultaneously supplied to the main LCD 4 and sub-LCD 6.

Figure 8:
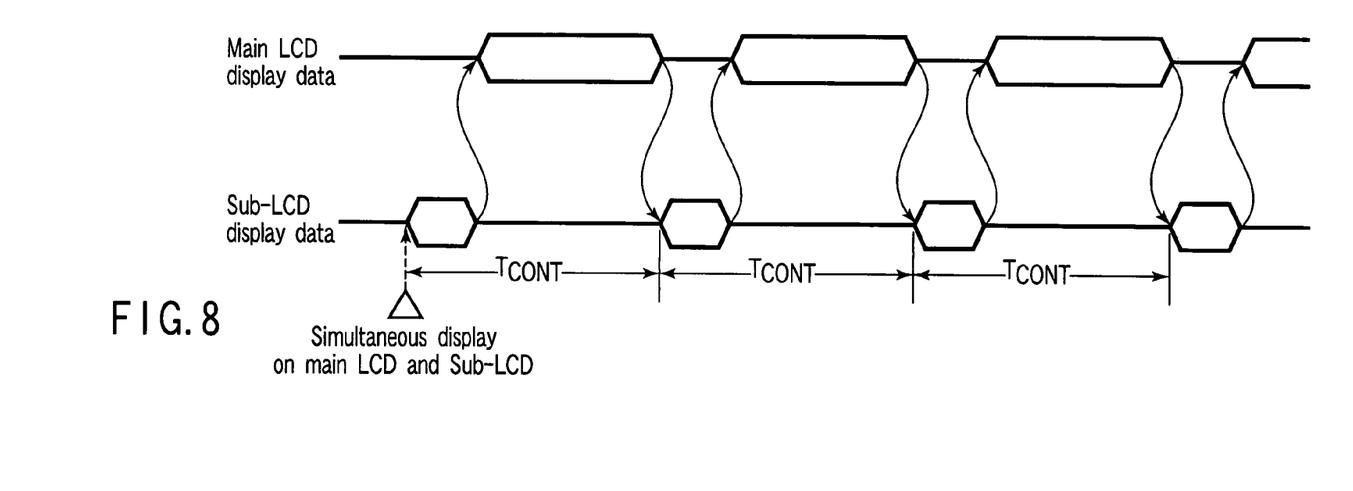
FIG. 8 is a timing chart used to explain the operation of the portable communication terminal shown in FIG. 7.

In this case, a switch 15 is switched to an interface 17 side to connect the sub-display control unit 13 to the sub-LCD 6. As shown in FIG. 8, the sub-display control unit 13 supplies the termination notification display data to the sub-LCD 6. The sub-LCD 6 displays the supplied display data.

The switch 15 is switched from the interface 17 side to the main LCD control circuit 14 side to connect the main LCD control circuit 14 to the main LCD 4. As shown in FIG. 8, the main LCD control circuit 14 supplies the termination notification display data to the main LCD 4. The main LCD 4 displays the supplied display data.

At this time, supply of display data from the sub-display control unit 13 to the sub-LCD 6 stops. However, the sub-LCD 6 comprises the display buffer 22, and the display buffer 22 holds display data immediately before the stop. The held display data is read out from the display buffer 22 and supplied to the sub-LCD 6. Thus, the sub-LCD 6 keeps displaying the data.

Upon the lapse of a preset time Tcont while display data is supplied to the main LCD 4, the switch 15 is switched from the main LCD control circuit 14 side to the interface 17 side to connect the sub-display control unit 13 to the sub-LCD 6 for only a predetermined time. In this state, the sub-display control unit 13 supplies new updated display data to the sub-LCD 6. The display data held by the display buffer 22 is updated to the new display data, and the data displayed on the sub-LCD 6 is also updated to the new updated display data.

Supply of display data to the main LCD 4 stops during updating of data displayed on the sub-LCD 6. However, the main LCD 4 comprises the display buffer 21, and the display buffer 21 holds display data immediately before the stop of supply. The held display data is supplied from the display buffer 21 to the main LCD 4. Thus, the main LCD 4 keeps displaying the data.

Similarly, the switch 15 is switched from the main LCD control circuit 14 side to the interface 17 side for only a predetermined time in the cycle of the predetermined time Tcont, and the data displayed on the sub-LCD 6 is updated. Although the signal line cable 7 is shared, the main LCD 4 and sub-LCD 6 can simultaneously display data in appearance while the display data is periodically updated.

Also in the second embodiment, when the connection destination of the signal line cable 7 is to be switched, the chip selects of the LCDs 4 and 6 are invalidated, and the signal line cable 7 is disconnected from the LCDs 4 and 6, as shown in FIGS. 5 and 6. The signal line cable 7 is connected to the LCDs 4 and 6, and then the chip selects are validated. With this arrangement, the influence of noise or the like generated in switching the signal line cable 7 can be eliminated, and stable display operation can be realized, similar to the first embodiment.

Another Embodiment

Figure 9:
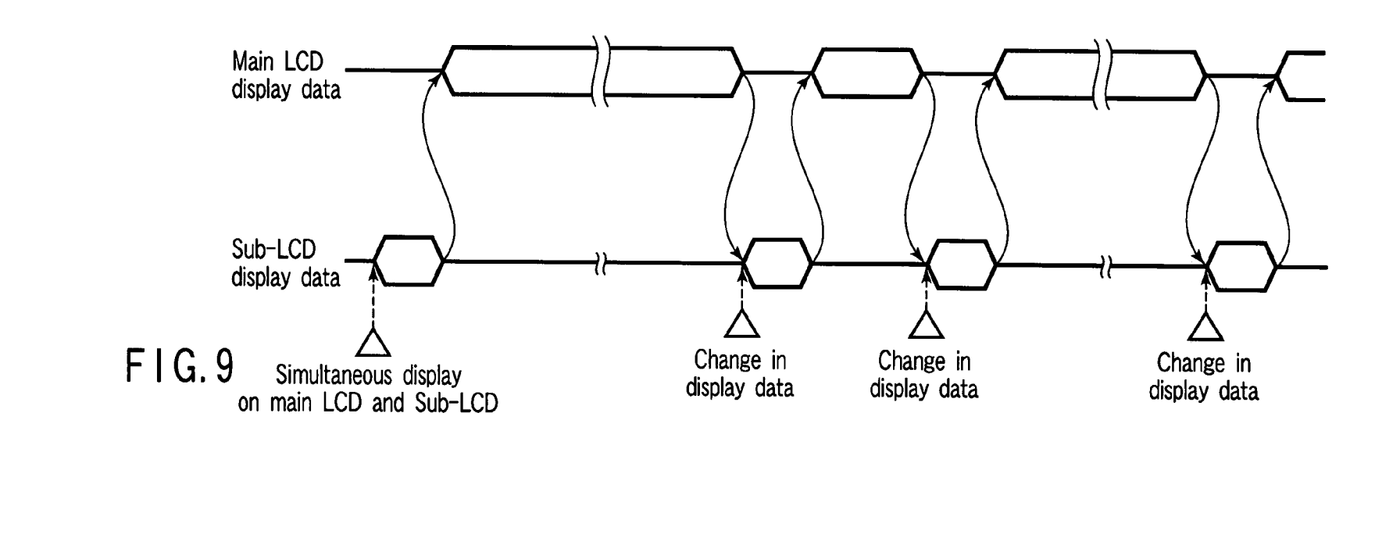
FIG. 9 is a timing chart used to explain the operation of a portable communication terminal according to another embodiment of the present invention.

The second embodiment periodically updates data displayed on the sub-LCD 6. Alternatively, whether to update data displayed on the sub-LCD 6 may be determined during supply of display data to the main LCD 4, and when updating becomes necessary, the updating process may be executed. FIG. 9 is a timing chart showing an example of the display data supply timing.

The present invention can also be applied to a notebook type personal computer, portable television receiver, portable game machine, and portable audio video player in addition to a foldable portable communication terminal. Further, the layout of the first and second displays, the type of display, the number of displays, the type of switching circuit, the type of signal line cable, the layout of the signal line cable, and the like can also be variously modified without departing from the spirit and scope of the present invention.

In short, the present invention is not limited to the above-described embodiments, and the building components can be variously modified and implemented without departing from the spirit and scope of the invention in practical use. Various inventions can be formed by an appropriate combination of building components disclosed in the above-described embodiments. For example, several building components may be omitted from all those described in the embodiments. Also, building components disclosed in different embodiments may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
   a first display;
   a first display control circuit configured to control display operation in the first display;
   a second display configured to be arranged independently of the first display;
   a second display control circuit configured to control display operation in the second display;
   a signal transmission path including shared signal lines connected to both the first display and the second display;
   a switching circuit configured to connect the shared signal lines with the first display control circuit while disconnecting the shared signal lines from the second display control circuit, and alternately to connect the shared signal lines with the second display control circuit while disconnecting the shared signal lines from the first display control circuit, by the signal transmission path; and
   a switching control circuit configured to perform switching control of the switching circuit in synchronism with display control by the first display control circuit and the second display control circuit,
   wherein when the signal transmission path is switched from a first state in which the first display and the first display control circuit are connected to a second state in which the second display and the second display control circuit are connected, the first display control circuit, the second display control circuit, and the switching control circuit invalidate a chip select of the first display, stop transmission of display data to the first display, switch the signal transmission path from the first state to the second state by using the switching circuit, start supply of display data to the second display, and validate a chip select of the second display.

2. The device according to claim 1, wherein at least one of the switching circuit and the switching control circuit is integrated with one of the first display control circuit and the second display control circuit to form one circuit module.

3. The device according to claim 1, wherein:
   the switching circuit includes variable terminals, first fixed terminals, and second fixed terminals;
   the variable terminals are connected to the first display via first signal lines and connected to the second display via branch signal lines branching off from the first signal lines;
   the first fixed terminals are connected to the first display control circuit via second signal lines; and
   the second fixed terminals are connected to the second display control circuit via third signal lines independent of the second signal lines.

4. The device according to claim 3, wherein when the first and second displays are housed in a first housing and the first and second display control circuits and the switching circuit are housed in a second housing different from the first housing, the first and second housings are connected by the first signal lines, and the branch signal lines branch off from the first signal lines in the first housing.

5. The device according to claim 3, wherein the switching circuit performs switching to connect the variable terminals to one of the first and second fixed terminals, in accordance with a switching control signal output from the switching control circuit, to connect one of the first and second display control circuits to the first and second displays.

6. The device according to claim 3, wherein:
   the first and second displays include chip select input terminals;
   the first and second display control circuits include chip select output terminals; and
   the chip select input terminals of the first and second displays are directly connected to the chip select output terminals of the first and second displays via first and second chip select lines, respectively, without passing through the switching circuit.

7. A display device comprising:
   a first display;
   a first display control circuit configured to control display operation in the first display;
   a second display configured to be arranged independently of the first display;
   a second display control circuit configured to control display operation in the second display;
   a signal transmission path including shared signal lines connected to both the first display and the second display;
   a switching circuit configured to connect shared signal lines with the first display control circuit while disconnecting the shared signal lines from the second display control circuit, and alternately to connect the shared signal lines with the second display control circuit while disconnecting the shared signal lines from the first display control circuit, by the signal transmission path;
   a switching control circuit configured to perform switching control of the switching circuit in synchronism with display control by the first display control circuit and the second display control circuit; and
   a display holding circuit configured to be arranged in at least one of the first display and the second display, hold display data transmitted from the first display control circuit and the second display control circuit via the signal transmission path, and even after the switching circuit is switched, keep supplying the held display data to the first display and the second display;
   wherein while the display holding circuit holds first display data, the first display control circuit, the second display control circuit, and the switching control circuit periodically switch the switching circuit, transmit second display data to the display holding circuit, and update the first display data held by the display holding circuit to the second display data.

8. The device according to claim 7, wherein:
   the display holding circuit includes a first display buffer connected to the first display, and a second display buffer connected to the second display;
   the switching circuit includes variable terminals, first fixed terminals, and second fixed terminals;
   the variable terminals are connected to the first display buffer via first signal lines, and connected to the second display buffer via branch signal lines branching off from the first signal lines;
   the first fixed terminals are connected to the first display control circuit via second signal lines; and
   the second fixed terminals are connected to the second display control circuit via third signal lines independent of the second signal lines.

9. The device according to claim 8, wherein when the first and second displays and the first and second display buffers are housed in a first housing, and the first and second display control circuits and the switching circuit are housed in a second housing different from the first housing, the first and second housings are connected by the first signal lines, and the branch signal lines branch off from the first signal lines in the first housing.

10. The device according to claim 8, wherein the switching circuit performs switching to connect the variable terminals to one of the first and second fixed terminals, in accordance with a switching control signal output from the switching control circuit, to connect one of the first and second display control circuits to the first and second display buffers.

11. The device according to claim 8, wherein:
the first and second displays include chip select input terminals;
the first and second display control circuits include chip select output terminals;
the chip select output terminal of the first display control circuit is directly connected to the chip select input terminal of the first display via a first chip select line without passing through the switching circuit and the first display buffer; and
the chip select output terminal of the second display control circuit is connected to the second display buffer via a second chip select line without passing through the switching circuit, and is further connected to the chip select input terminal of the second display via the second display buffer.

12. A display device comprising:
a first display;
a first display control circuit configured to control display operation in the first display;
a second display configured to be arranged independently of the first display;
a second display control circuit configured to control display operation in the second display;
a signal transmission path including shared signal lines connected to both the first display and the second display;
a switching circuit configured to connect the shared signal lines with the first display control circuit while disconnecting the shared signal lines from the second display control circuit, and alternately to connect the shared signal lines with the second display control circuit while disconnecting the shared signal lines from the first display control circuit, by the signal transmission path; and
a switching control circuit configured to perform switching control of the switching circuit in synchronism with display control by the first display control circuit and the second display control circuit.

13. The display device of claim 12, further comprising:
a display holding circuit configured to be arranged in at least one of the first display and the second display, hold display data transmitted from the first display control circuit and the second display control circuit via the signal transmission path, and even after the switching circuit is switched, keep supplying the held display data to the first display and the second display;
wherein while the display holding circuit holds first display data, the first display control circuit, the second display control circuit, and the switching control circuit determine whether to update the first display data, and when the first display data is determined to be updated, switch the switching circuit, transmit second display data to the display holding circuit, and update the first display data held by the display holding circuit to the second display data.

14. The display device of claim 12, wherein:
the display device comprises a portable electronic device in which a first housing and a second housing are connected via a connection mechanism;
the first display and the second display are in the first housing;
the first display control circuit and the second display control circuit are in the second housing;
the signal transmission path is between the first housing and the second housing via the connection mechanism; and
when the signal transmission path is switched from a first state in which the first display and the first display control circuit are connected to a second state in which the second display and the second display control circuit are connected, the first display control circuit, the second display control circuit, and the switching control circuit invalidate a chip select of the first display, stop transmission of display data to the first display, switch the signal transmission path from the first state to the second state by using the switching circuit, start supply of display data to the second display, and validate a chip select of the second display.

15. The device according to claim 14, wherein at least one of the switching circuit and the switching control circuit is integrated with one of the first display control circuit and the second display control circuit to form one circuit module.

16. The display device of claim 12, wherein:
the display device comprises a portable electronic device in which a first housing and a second housing are connected via a connection mechanism;
the first display and the second display are in the first housing;
first display control circuit and the second display control circuit are in the second housing;
the signal transmission path is between the first housing and the second housing via the connection mechanism;
the display device further comprises a display holding circuit configured to be arranged in at least one of the first display and the second display, hold display data transmitted from the first display control circuit and the second display control circuit via the signal transmission path, and even after the switching circuit is switched, keep supplying the held display data to the first display and the second display; and
while the display holding circuit holds first display data, the first display control circuit, the second display control circuit, and the switching control circuit periodically switch the switching circuit, transmit second display data to the display holding circuit, and update the first display data held by the display holding circuit to the second display data.

17. The display device of claim 12, wherein:
the display device comprises a portable electronic device in which a first housing and a second housing are connected via a connection mechanism;
the first display and the second display are in the first housing;
the first display control circuit and the second display control circuit are in the second housing;
the signal transmission path is between the first housing and the second housing via the connection mechanism;
the display device further comprises a display holding circuit configured to be arranged in at least one of the first display and the second display, hold display data transmitted from the first display control circuit and the second display control circuit via the signal transmission path, and even after the switching circuit is switched, keep supplying the held display data to the first display and the second display; and
while the display holding circuit holds first display data, the first display control circuit, the second display control circuit, and the switching control circuit determine whether to update the first display data, and when the first display data is determined to be updated, switch the switching circuit, transmit second display data to the display holding circuit, and update the first display data held by the display holding circuit to the second display data.

18. The display device of claim 12, wherein:
The display device comprises a portable electronic device in which a first housing and a second housing are connected via a connection mechanism;

the first display and the second display are in the first housing;

the first display control circuit and the second display control circuit are in the second housing; and the signal transmission path is between the first housing and the second housing via the connection mechanism.

* * * * *